(12) United States Patent
Raksha et al.

(10) Patent No.: US 8,511,712 B2
(45) Date of Patent: Aug. 20, 2013

(54) MIXTURE OF MAGNETICALLY ORIENTABLE COLOR SHIFTING FLAKES AND NON-MAGNETICALLY ORIENTABLE COLOR SHIFTING FLAKES EXHIBITING A COMMON COLOR

(75) Inventors: Vladimir P. Raksha, Santa Rosa, CA (US); Michael R. Nofi, Rohnert Park, CA (US); Charles T. Markantes, Santa Rosa, CA (US); Paul G. Coombs, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 196 days.

(21) Appl. No.: 12/803,715

(22) Filed: Jun. 30, 2010

(65) Prior Publication Data

US 2011/0121556 A1     May 26, 2011

Related U.S. Application Data

(60) Provisional application No. 61/264,178, filed on Nov. 24, 2009.

(51) Int. Cl.
*B42D 15/00*     (2006.01)
*B42D 15/10*     (2006.01)

(52) U.S. Cl.
USPC .......... 283/91; 283/72; 283/82; 283/94; 283/98

(58) Field of Classification Search
USPC .......... 283/72, 82, 83, 85, 91, 94, 98, 107, 283/109, 110
See application file for complete search history.

(56) References Cited

U.S. PATENT DOCUMENTS

| | | | |
|---|---|---|---|
| 3,853,676 A | 12/1974 | Graves | 428/207 |
| 5,279,657 A | 1/1994 | Phillips et al. | 106/31.65 |
| 5,570,847 A | 11/1996 | Phillips et al. | 241/23 |
| 6,236,510 B1 | 5/2001 | Bradley, Jr. et al. | 359/585 |
| 6,294,010 B1 | 9/2001 | Pfaff et al. | 106/415 |
| 7,047,883 B2 | 5/2006 | Raksha et al. | 101/489 |
| 7,258,900 B2 | 8/2007 | Raksha et al. | 427/548 |
| 7,517,578 B2 | 4/2009 | Raksha et al. | 428/195.1 |
| 2008/0069979 A1 | 3/2008 | Raksha et al. | 428/29 |
| 2009/0230670 A1* | 9/2009 | Schmid et al. | 283/85 |

FOREIGN PATENT DOCUMENTS

DE     4313541     10/1994

* cited by examiner

*Primary Examiner* — Dana Ross
*Assistant Examiner* — Justin V Lewis
(74) *Attorney, Agent, or Firm* — Matthew A. Pequignot; Pequignot + Myers LLC

(57) ABSTRACT

Pigment flakes are blended together wherein some are magnetically alignable and exhibit a color shift from a first color to a second color with a change in viewing angle; and some are pigment flakes which exhibit a color shift from the first color to a third color or vice versa with a change in viewing angle, wherein the first, second and third colors are three different colors. The flakes are coated upon a substrate and magnetically alignable flakes are magnetically aligned. The non-magnetically alignable flakes are not aligned by the magnetic field and lie flat upon the substrate they are coated on. By judiciously selecting the angle upon which the magnetic flakes are oriented, an effect is created whereby an observer sees a color shift from a first color to a second or a first color to a third, when orienting the substrate by tilting it at different particular angles. The coated substrate can be used in security applications such as on currency or secure instruments.

8 Claims, 5 Drawing Sheets
(1 of 5 Drawing Sheet(s) Filed in Color)

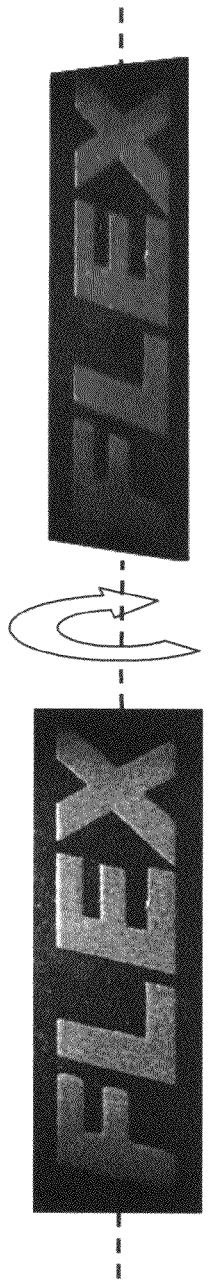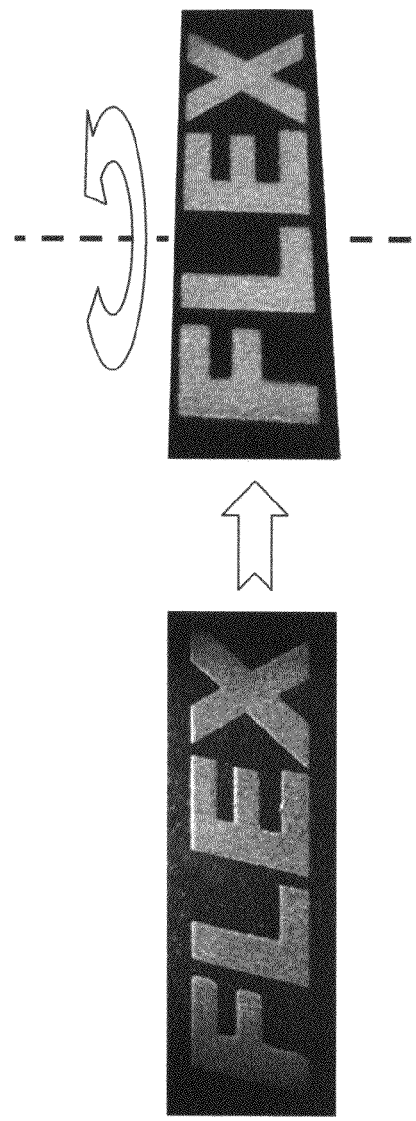

MIXTURE OF MAGNETICALLY ORIENTABLE COLOR SHIFTING FLAKES AND NON-MAGNETICALLY ORIENTABLE COLOR SHIFTING FLAKES EXHIBITING A COMMON COLOR

CROSS-REFERENCE TO RELATED APPLICATIONS

This application claims priority of U.S. Provisional Patent application No. 61/264,178 filed Nov. 24, 2009, entitled "Printed Two-directional angle-dependent color-shifting security article" which is incorporated herein by reference for all purposes.

FIELD OF THE INVENTION

This invention relates to color shifting pigment and coatings, particularly the type used on banknotes, labels, security documents and those requiring an appealing coating or a security color shift coating.

BACKGROUND OF THE INVENTION

Color shifting coatings are well known and can be found on some United States banknotes and on banknotes of many other countries. Although printed or hot stamped diffractive structures are color changing and are sometimes said to be color shifting, this invention relates primarily a color shift that occurs through thin film interference effects; that is, from multilayered thin film coatings having a reflector, a spacer and an absorber or a stack of interference layers. U.S. Pat. Nos. 6,236,510, 5,570,847, and 5,279,657 are some exemplary patents in the name of Roger Phillips where thin film interference flakes are disclosed. U.S. Pat. Nos. 7,258,900, 7,047,883 and 7,517,578 in the name of Raksha et al. disclose magnetically alignable thin film pigment flakes and methods of aligning such flakes. All of the abovementioned patents and applications are incorporated herein by reference, for all purposes.

United States patent application US 20080069979, incorporated herein by reference, entitled "Security image coated with a single coating having visually distinct regions" discloses a security image which is formed from flakes having a first color with flakes having a second different color mixed within a carrier uniformly. The flakes having the second color are magnetically orientable and the flakes having the first color are non-magnetic and do not align or orient in a magnetic field. By exposing at least a single coated region to a magnetic field that is substantially orthogonal to the substrate upon which the coating of flakes is coated, a visible region having the first color is provided as the magnetic flakes are upstanding and the non-magnetic flakes are lying flat upon the substrate. In another region where there is no magnetic field applied, a visible region having a third perceived color that is different from the first color or the second color seen. Although interesting effects are provided using this method, the instant invention affords a flexibility in which way the coating is viewed or from where the incident light is located.

This invention takes advantage of the fact that magnetic and non-magnetically oriented flakes behave differently in the presence of a magnetic field. Furthermore carefully selecting goniochromatic characteristics of the flakes and the angle of the magnetic field, yields a very useful security coating which exhibits a color shift when tilted from East to West or North to South; and wherein the security coating exhibits a different color when tilted from East to West or North to South, and wherein the same color is exhibited when the coating is viewed at normal angle.

It is an object of this invention to produce a coating that has two different color shifting effects when observed from two different directions and the same color when observed at normal angle.

It is an object of this invention to produce a color shift between a first and second color when tilted about a first axis, and that produces a color shift from the first to a third color when tilted about an axis orthogonal to the first axis, wherein the first, second and third colors are three visually distinguishable different colors.

It is a further object of this invention to use a mixture of magnetically oriented magnetic color shifting flakes and non-magnetic non-oriented color shifting flakes wherein a color of the flakes is the same at normal incidence.

It is a further object of this invention to use a mixture of only two different flake types arranged and fixed in a particular orientation upon a substrate, to yield a color shift from a first to a second color, or from the first to a third color depending upon the tilt of the substrate.

SUMMARY OF THE INVENTION

In accordance with an aspect of the invention there is provided a blend of pigment flakes comprising a first plurality of the magnetically alignable pigment flakes which exhibit a color shift from a first color to a second color with a change in viewing angle; and a second plurality of flakes having a color shift from the first color to a third color or vice versa with a change in viewing angle, wherein the first, second and third colors are three different colors.

In accordance with another aspect of the invention there is provided a coating comprising blend of magnetically aligneble magnetic and non-magnetic flakes, wherein the magnetic flakes have a color shift through thin film interference with a change in viewing angle from a first color to a second color and wherein the non-magnetic flakes have a color shift through thin film interference with a change in viewing angle from a third color to the first color.

In accordance with an aspect of the invention there is provided a blend of pigment flakes comprising a first plurality of non-magnetic pigment flakes (aligned parallel to the substrate) which exhibit a color shift from a first color to a second color with a change in viewing angle; and a second plurality of magnetic flakes magnetically aligned at the angle to the substrate having a color shift from the first color to a third color or vice versa with a change in viewing angle, wherein the first, second and third colors are three different colors.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary embodiments of the invention will be described in conjunction with the drawings in which:

FIGS. 9a, 9b, 10a, and 10b are photographs of a substrate coated with magnetic gold to green and non-magnetic green to blue flakes wherein the magnetic flake are magnetically aligned.

DETAILED DESCRIPTION

This invention provides a mixture of two types of flakes; magnetically orientable flakes and non-magnetically orientable flakes. The flakes have a common characteristic. The two types of flakes are thin film interference color shifting flakes which shift from a same color to a different color when tilted with respect to the observer or when the angle of incident light is changed to affect a color shift. Therefore, when the mixture of flakes are coated upon a substrate and a magnetic field is applied so as to align the magnetic flakes in a preferred alignment, as the substrate is tilted from East to West, there is a color shift from a first color to a second; and as the substrate is tilted from North to south, there is a color shift from the second color to a third color, wherein the first, second and third colors are different colors which can be visually distinguished.

Figure 2:
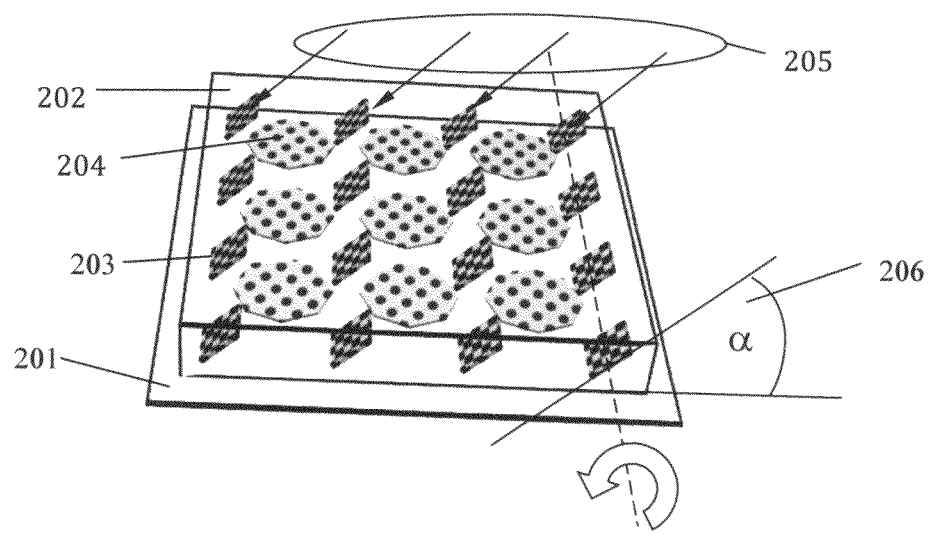
FIG. 2 is a drawing in accordance with the invention showing magnetically aligned shaped substantially planar flakes 205 and non-magnetically alignable shaped substantially planar flakes 204 which are coplanar with the substrate.

The present invention uses a blend of magnetic and non-magnetic pigment particles as well. The magnetic particles are multi-layer flakes, which have a layer of magnetically alginable material. The blend of magnetic and non-magnetic flakes is dispersed in a binder, preferably an organic binder and can be printed as shown in FIG. 2 on a flexible or non-flexible substrate. The ink or paint 202 is printed on the top of the substrate 201. The ink or paint contains magnetic particles 203 and non-magnetic pigment particles 204. The particles can be purposefully shaped or may be random shaped particles. The flakes can be as small as 1 micron across and as large as 100 microns across a surface thereof. In further forming the coating upon a substrate an external magnetic field is applied to the printed article in the direction 205; and, all of the magnetic pigment particles orient themselves parallel to the field and to each other in a direction of the field at the angle α 206 to the substrate and to the surface of non-magnetic particles. The non-magnetic particles 204 are unaffected by the magnetic field and become oriented parallel or close to parallel to the substrate 201. As a result of the different spatial position of the magnetic and non-magnetic particles in the ink or paint, the magnetic and non-magnetic particles reflect incident light in a different direction with respect to an observer as it is illustrated in FIGS. 3 and 4.

For the purposes of illustration only the non-magnetically alignable flakes are octagonal shaped flakes and the aligned flakes 203 and 205 are square shaped. Furthermore, only for the purposes of illustration to visibly differentiate between the two types of flakes a checkerboard and dotted pattern on used on the magnetic and non-magnetic flakes respectively. In reality the flakes are not patterned in this way.

For the purposes of illustration only the magnetically alignable flakes are hexagonal shaped flakes and the aligned flakes 203 and 205 are square shaped. Furthermore, only for the purposes of illustration to visibly differentiate between the two types of flakes a checkerboard and dotted pattern on used on the magnetic and non-magnetic flakes respectively. In reality the flakes are not patterned in this way.

Figure 3:
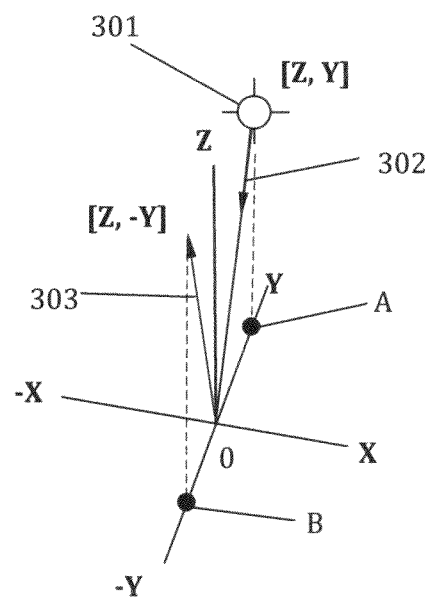
FIG. 3 shows a beam of light incident upon a flake wherein the light is at a position [Z,Y] and wherein the viewer is viewing from a position [Z-Y].
Figure 4:
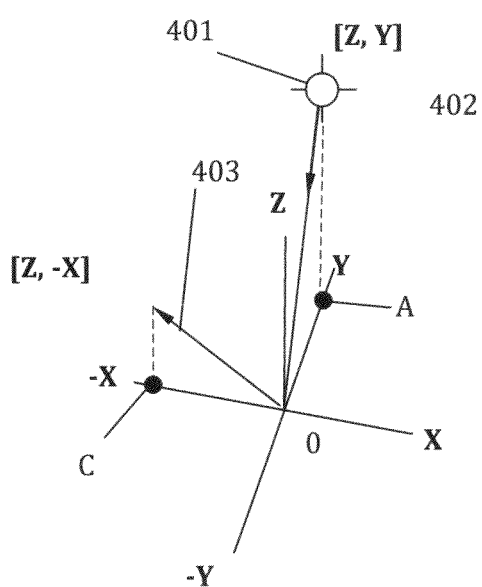
FIG. 4 shows a beam of light incident upon a flake wherein the light is at a position [Z,Y] and wherein the viewer is viewing from a position [Z-X].

Turning now to FIG. 3, when light rays from the distant light source 301 at location having coordinates XYZ with X=0 impinge upon the surface of the non-magnetic platelets at the region 0 they are reflected back in the direction 303 to a location having coordinates XYZ where X=0 and Y<0. Projection vectors of incident and reflected rays of light at the XY coordinates are at points A and B respectively.

Referring now to FIG. 4 the light from the same light source reflects differently from the magnetically aligned particles than it did from the non-magnetic particles shown in FIG. 3. The light from the source 401 with the same coordinates XYZ with X=0 comes to the region 0 of the printed article along the direction 402 and reflects from counterclockwise tilted magnetic platelets in the direction 403 with coordinates XYZ where Y=0 and X<0. Projection vectors of incident and reflected rays of light at the XY coordinates now are at points A and C respectively.

Figure 1:
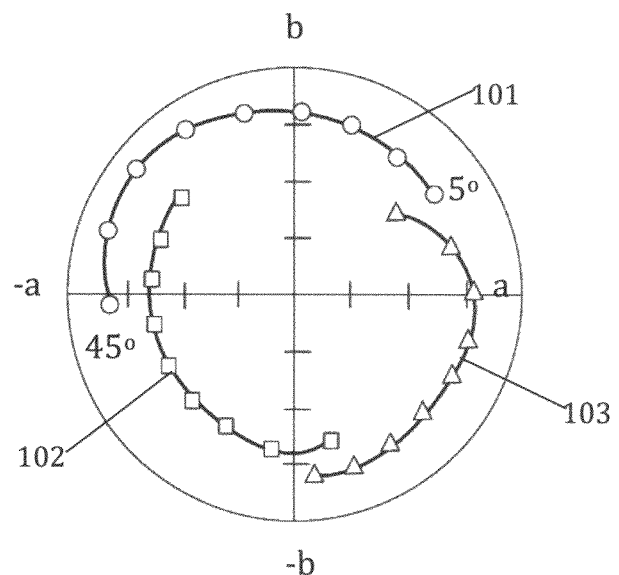
FIG. 1 is a graph showing Lab color coordinates and the color of a changing pigment with a change in observation angle from 5° to 45°.
Figure 5:
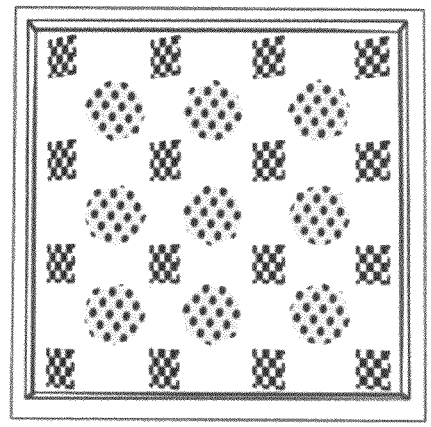
FIG. 5 is an illustration of the substrate showing the upstanding and flat lying flakes at normal incidence wherein a same color is seen from magnetic and non-magnetically alignable flakes.
Figure 6:
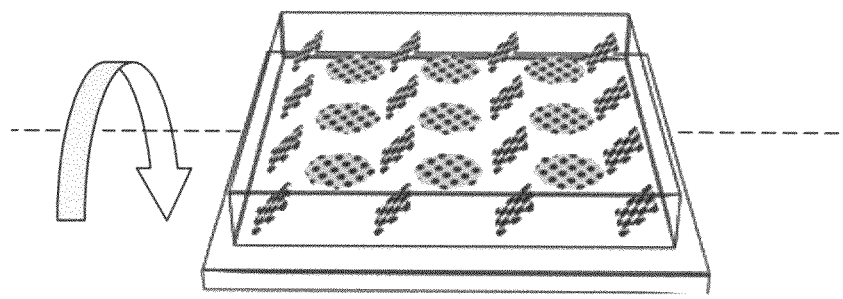
FIG. 6 is an illustration where the article is tilted away from the observer as it is rotated along the X-axis in FIG. 3.

To reduce the influence of colors of one pigment, for example the magnetic pigment on the colors of another pigment, for example the non-magnetic pigment, one common color is used in the blend pigments. An example of these pigments is illustrated in FIG. 1. They are magnetic gold to green shifting pigment 101 and non-magnetic green to blue shifting pigments 102, wherein green is the common color shared by both pigments. The magnetic pigment 101 has a green color when its particles are magnetically oriented at 45° to non-magnetic particles. Non-magnetic green to blue pigment 102 has green color at 0° because it is parallel to the substrate. Both pigments display the same color at the normal angle of observation of the article or substrate as illustrated in FIG. 5. Most of the incoming light rays are reflected back by non-magnetic color-shifting pigment particles, that is the octagonal platelets with polka dotted pattern exhibiting green color. The magnetically oriented particles are also exhibit a green color because they were aligned at 45° to the substrate. When the article is tilted away from the observer as illustrated in FIG. 6 it is rotated along the X-axis in FIG. 3. The color of non-magnetic particles, the hexagon with polka dotted pattern particles changes to blue according to the curve 102 in FIG. 1. As was mentioned earlier, the polka dotted and checkerboard effects in the figures are merely illustrative ways of differentiating the two types of flakes in the figures. The flakes do not actually have these patterns.

To reduce the influence of colors of one pigment, for example the magnetic pigment on the colors of another pigment, for example the non-magnetic pigment, one common color is used in the blend pigments. An example of these pigments is illustrated in FIG. 1. They are magnetic gold to green shifting pigment 101 and non-magnetic green to blue shifting pigments 102, wherein green is the common color shared by both pigments. The magnetic pigment 101 has a green color when its particles are magnetically oriented at 45°to non-magnetic particles. Non-magnetic green to blue pigment 102 has green color at 0° because it is parallel to the substrate. Both pigments display the same color at the normal angle of observation of the article or substrate as illustrated in FIG. 5. Most of the incoming light rays are reflected back by non-magnetic color-shifting pigment particles 501, that is the hexagonal platelets with polka dotted pattern exhibiting green color. The magnetically oriented particles are also exhibit a green color because they were aligned at 45° to the substrate. When the article is tilted away from the observer as illustrated in FIG. 6 it is rotated along the X-axis in FIG. 3. The color of non-magnetic particles, the hexagon with polka dotted pattern particles changes to blue according to the curve 102 in FIG. 1. As was mentioned earlier, the polka dotted and checkerboard effects in the figures are merely illustrative ways of differentiating the two types of flakes in the figures. The flakes do not actually have these patterns.

Figure 7:
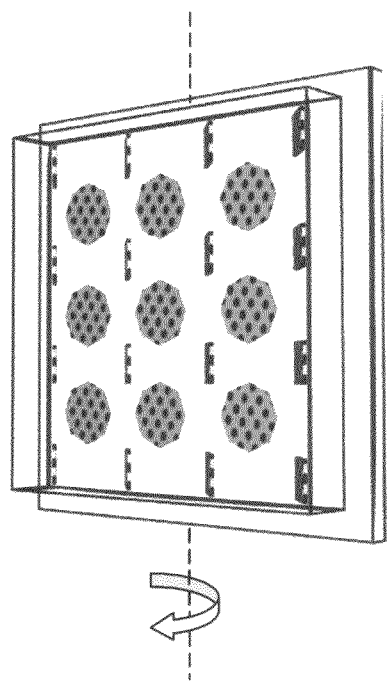
FIG. 7 is an illustration where the article is tilted along the Y-axis and wherein the magnetic particles oriented with their planes coincident with the observation direction become invisible.
Figure 8:
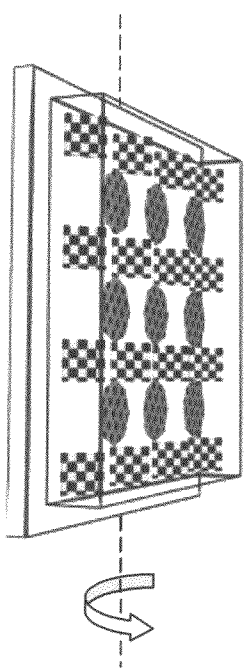
FIG. 8 is an illustration wherein magnetic particles shown as squares with the checker pattern become highly visible and the article switches to a gold color.

When the article is tilted along the Y-axis to the left as illustrated in FIG. 7 magnetic particles oriented with their planes coincident with the observation direction become invisible. However, when the article is tilted to the right as shown in FIG. 8 magnetic particles, squares with the checker pattern become highly visible and the article switches to a gold color.

Turning now to FIGS. 9*a*, through 10*b* magnetic gold to green and non-magnetic green to blue were used in this exemplary embodiment. Visual appearance of this combination of pigments can be seen while viewing FIGS. 9*a* through 10*b*. The green color of the print, containing these pigments, can be seen at normal angle of observation as illustrated in FIG. 9*a*. When the sample is tilted away from the observer as in FIG. 9*b* the color appears as blue. Tilting back to the normal angle restores the green color as in FIG. 10*a*. Tilting the sample to the right shifts color to gold is shown in FIG. 10*b*.

The blend of color shifting pigments of this invention can be used on banknotes, labels, security documents and those requiring an appealing coating or a security color shift coating.

What is claimed is:

1. A blend of pigment flakes coated upon a substrate comprising:
   a first plurality of magnetically aligned pigment flakes which exhibit a color shift from a first color to a second color with a first change in viewing angle; and,
   a second plurality of non-magnetically alignable pigment flakes which exhibit a color shift from the first color to a third color or vice versa with a second different change in viewing angle and wherein the first and second plurality of flakes have a different orientation, wherein the first, second and third colors are three different colors, and wherein the first plurality and second plurality of flakes exhibit the first color when viewing the substrate at normal incidence, wherein the flakes are coated upon the substrate in a binder forming a mixture of flakes and wherein the magnetically alignable flakes are aligned in a substantially same orientation that is different from the orientation of the non-magnetically alignable flakes, wherein the first plurality of flakes are aligned in a different manner upon the substrate than the second plurality of flakes so that tilting the substrate about a first axis yields an observable color shift from first color to the second color or vice versa and such that tilting the substrate about a second different axis yields a color shift from the first color to the third color or vice versa, wherein the first axis and the second axis are orthogonal axes.

2. A blend of pigment flakes as defined in claim 1 wherein the second plurality of pigment flakes are non-magnetically alignable and wherein the first plurality of magnetically alignable pigment flakes and second plurality of pigment flakes have the color shift through thin film interference effects of light incident thereon, and wherein the first and second plurality of flakes are intermixed, and wherein the second plurality of flakes are substantially coplanar with the substrate.

3. A blend of pigment flakes as defined in claim 2 wherein the substrate is a thread or a banknote or a financial instrument.

4. A blend of pigment flakes as defined in claim 3 wherein the flakes are between 1 micron and 100 microns across a surface thereof.

5. A blend of pigment flakes as defined in claim 4 wherein the flakes are substantially planar shaped flakes having one or more predetermined shapes.

6. A blend of flakes as defined in claim 2 wherein the mixture is an ink or paint.

7. A blend of flakes as defined in claim 2 wherein the first plurality of magnetically alignable pigment flakes makes up 40-60% of the total number of flakes.

8. A blend of flakes as defined in claim 1 wherein the first plurality of magnetically alignable pigment flakes is greater than 10000 in number and wherein the second plurality of pigment flakes is greater than 10000 in number.

* * * * *